(12) United States Patent
Kajouke

(10) Patent No.: US 8,466,658 B2
(45) Date of Patent: Jun. 18, 2013

(54) SYSTEMS AND METHODS FOR BI-DIRECTIONAL ENERGY DELIVERY WITH GALVANIC ISOLATION

(75) Inventor: Lateef A. Kajouke, San Pedro, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 588 days.

(21) Appl. No.: 12/535,975

(22) Filed: Aug. 5, 2009

(65) Prior Publication Data

US 2011/0031930 A1 Feb. 10, 2011

(51) Int. Cl.
*H02J 7/00* (2006.01)
(52) U.S. Cl.
USPC ........................................................ 320/128
(58) Field of Classification Search
USPC ........................................................ 320/128
See application file for complete search history.

(56) References Cited

U.S. PATENT DOCUMENTS

| | | | |
|---|---|---|---|
| 4,669,036 A | 5/1987 | Cowett, Jr. | |
| 5,159,539 A | 10/1992 | Koyama | |
| 5,189,603 A | 2/1993 | Sashida et al. | |
| 5,274,538 A | 12/1993 | Sashida et al. | |
| 5,285,365 A | 2/1994 | Yamato et al. | |
| 5,461,297 A | 10/1995 | Crawford | |
| 5,545,971 A | 8/1996 | Gomez et al. | |
| 5,949,659 A | 9/1999 | Lesche | |
| 6,034,513 A | 3/2000 | Farrington et al. | |
| 6,147,886 A | 11/2000 | Wittenbreder | |
| 6,351,397 B1 | 2/2002 | Sawa et al. | |
| 6,496,343 B2 | 12/2002 | Mahlein et al. | |
| 6,538,909 B2 * | 3/2003 | Goodarzi et al. | ............... 363/98 |
| 6,566,764 B2 | 5/2003 | Rebsdorf et al. | |
| 6,583,519 B2 * | 6/2003 | Aberle et al. | ............... 307/10.1 |
| 6,989,613 B2 | 1/2006 | Andrews et al. | |
| 6,998,732 B2 | 2/2006 | Xing et al. | |
| 7,330,363 B2 | 2/2008 | Ponnaluri et al. | |
| 7,483,282 B2 | 1/2009 | Kajouke et al. | |
| 7,492,221 B2 | 2/2009 | Lawson et al. | |
| 7,525,296 B2 | 4/2009 | Billig et al. | |
| 7,599,204 B2 | 10/2009 | Kajouke et al. | |
| 7,609,022 B2 | 10/2009 | Oyobe et al. | |
| 7,679,941 B2 | 3/2010 | Raju et al. | |
| 7,764,527 B2 | 7/2010 | Takayanagi | |
| 8,063,606 B2 | 11/2011 | Veselic | |

(Continued)

FOREIGN PATENT DOCUMENTS

| | | |
|---|---|---|
| DE | 102007040550 A1 | 3/2008 |
| GB | 2459542 A | 11/2009 |
| JP | 2008306855 A | 12/2008 |

OTHER PUBLICATIONS

Kajouke, L. et al., "Unity Power Factor Isolated Single Phase Matrix Converter Battery Charger," U.S. Appl. No. 12/413,181, filed Mar. 27, 2009.

(Continued)

*Primary Examiner* — Arun Williams
(74) *Attorney, Agent, or Firm* — Ingrassia Fisher & Lorenz, P.C.

(57) ABSTRACT

Systems and methods are provided for bi-directional energy delivery. A charging system comprises a first bi-directional conversion module, a second bi-directional conversion module, and an isolation module coupled between the first bi-directional conversion module and the second bi-directional conversion module. The isolation module provides galvanic isolation between the first bi-directional conversion module and the second bi-directional conversion module.

13 Claims, 2 Drawing Sheets

U.S. PATENT DOCUMENTS

| | | | |
|---|---|---|---|
| 8,199,545 | B2 | 6/2012 | Nguyen et al. |
| 2001/0012207 | A1* | 8/2001 | Nomura .................. 363/17 |
| 2001/0026427 | A1 | 10/2001 | Mahlein et al. |
| 2001/0036086 | A1 | 11/2001 | Pascu et al. |
| 2002/0044468 | A1 | 4/2002 | Goodarzi et al. |
| 2002/0176261 | A1 | 11/2002 | Norrga |
| 2003/0102718 | A1* | 6/2003 | Hockney et al. ........... 307/43 |
| 2004/0026929 | A1 | 2/2004 | Rebsdorf et al. |
| 2004/0041543 | A1 | 3/2004 | Brooks et al. |
| 2004/0066663 | A1 | 4/2004 | Raichle |
| 2004/0119449 | A1 | 6/2004 | Matley |
| 2004/0257271 | A1 | 12/2004 | Jacobson et al. |
| 2007/0035265 | A1 | 2/2007 | Balog, Jr. et al. |
| 2007/0139975 | A1 | 6/2007 | Yamauchi et al. |
| 2007/0274109 | A1 | 11/2007 | Oyobe et al. |
| 2008/0013351 | A1 | 1/2008 | Alexander |
| 2008/0055938 | A1 | 3/2008 | Kajouke et al. |
| 2008/0055954 | A1 | 3/2008 | Kajouke et al. |
| 2008/0130339 | A1 | 6/2008 | McDonald et al. |
| 2009/0033393 | A1 | 2/2009 | Park et al. |
| 2009/0251938 | A1 | 10/2009 | Hallak |
| 2009/0322287 | A1 | 12/2009 | Ozeki et al. |
| 2010/0103703 | A1 | 4/2010 | Nishiyama et al. |
| 2011/0032732 | A1 | 2/2011 | Hsu |
| 2011/0080151 | A1 | 4/2011 | Rahardjo et al. |
| 2011/0089928 | A1 | 4/2011 | O'Gorman et al. |

OTHER PUBLICATIONS

Kajouke, L. et al., "Charging System With Galvanic Isolation and Multiple Operating Modes," U.S. Appl. No. 12/535,994, filed Aug. 5, 2009.

Office Action, dated Oct. 5, 2011, for U.S. Appl. No. 12/413,181.

German Office Action, dated Mar. 21, 2012, for German Patent Application No. 10 2011 085 063.5.

Chu, Grace, et al., "A Unified Approach for the Derivation of Robust Control for Boost PFC Converters," IEEE Transactions on Power Electronics, Nov. 2009, pp. 2531-2544, vol. 24, Issue: 11.

U.S. Office Action, dated Nov. 25, 2011, for U.S. Appl. No. 12/622,088.

U.S. Office Action, dated Jan. 23, 2012, for U.S. Appl. No. 12/535,994.

Figueres, E., et al. "A Control Circuit With Load-Current Injection for Single-Phase Power-Factor-Correction Rectifiers," IEEE Transactions on Industrial Electronics, Jun. 2007, pp. 1272-1281, vol. 54, No. 3.

Prathapan, P.T., et al., "Feedforward Current Control of Boost-Derived Single-phase PFC Converters," IEEE Applied Power Electronics Conference and Exposition, Mar. 2005, pp. 1716-1722, vol. 3.

Ransom R.M., et al. "Systems and Methods for Commutating Inductor Current Using a Matrix Converter," U.S. Appl. No. 12/622,088, filed Nov. 19, 2009.

Ransom, R.M., "Systems and Methods for Deactivating a Matrix Converter," U.S. Appl. No. 12/725,265, filed Mar. 16, 2010.

Kajouke, L.A., et al., "Systems and Methods for Reducing Transient Voltage Spikes in Matrix Converters," U.S. Appl. No. 12/839,134, filed Jul. 19, 2010.

Perisic, M., et al. "Compensation for Electrical Converter Nonlinearities," U.S. Appl. No. 12/941,552, filed Nov. 8, 2010.

Perisic, M., et al. "Systems and Methods for Providing Power to a Load Based Upon a Control Strategy," U.S. Appl. No. 12/949,439, filed Nov. 18, 2010.

Ransom, Ray, et al. "Systems and Methods for Initializing a Charging System," U.S. Appl. No. 13/149,484, filed May 31, 2011.

Perisic, M., et al. "Compensation for Electrical Converter Nonlinearities," U.S. Appl. No. 12/941,521, filed Nov. 8, 2010.

Kajouke, L.A., et al. "Systems and Methods for Reducing Harmonic Distortion in Electrical Converters," U.S. Appl. No. 12/941,488, filed Nov. 8, 2010.

Delorme, Gilles M., et al. "Methods and Systems for Controlling Vehicle Defrost Units," U.S. Appl. No. 12/871,664, filed Aug. 30, 2010.

Kajouke, L.A., et al. "Discharging a DC Bus Capacitor of an Electrical Converter System," U.S. Appl. No. 13/090,911, filed Apr. 20, 2011.

Perisic, M., et al. "Systems and Methods for Providing Power to a Load Based Upon a Control Strategy," U.S. Appl. No. 13/222,961, filed Aug. 31, 2011.

German Office Action, dated Jan. 27, 2012, for German Patent Application No. 10 2010 031 615.6.

USPTO, U.S. "Final Office Action" mailed Jun. 28, 2012, for U.S. Appl. No. 12/535,994, filed Aug. 5, 2008.

USPTO, U.S. "Notice of Allowance" mailed Jun. 11, 2012, for U.S. Appl. No. 12/622,088, filed Nov. 19, 2009.

USPTO, U.S. "Final Office Action" mailed May 10, 2012, for U.S. Appl. No. 12/413,181, filed Mar. 27, 2009.

Office Action, dated Jul. 23, 2012, for U.S. Appl. No. 12/725,265.

Office Action, dated Aug. 29, 2012, for U.S. Appl. No. 12/839,134.

Office Action, dated Oct. 24, 2012, for U.S. Appl. No. 12/941,552.

Office Action, dated Nov. 9, 2012, for U.S. Appl. No. 12/949,439.

Notice of Allowance, dated Nov. 15, 2012, for U.S. Appl. No. 12/725,265.

USPTO "Notice of Allowance" mailed Jan. 25, 2013; U.S. Appl. No. 12/839,134, filed Jul. 19, 2010.

USPTO "Non-Final Office Action" mailed Mar. 20, 2013; U.S. Appl. No. 12/941,488, filed Nov. 8, 2010.

Chinese Patent & Trademark Office. Chinese Office Action dated Feb. 1, 2013 for Patent Application for Invention No. 201010556242.0.

* cited by examiner

SYSTEMS AND METHODS FOR BI-DIRECTIONAL ENERGY DELIVERY WITH GALVANIC ISOLATION

STATEMENT REGARDING FEDERALLY SPONSORED RESEARCH OR DEVELOPMENT

This invention was made with Government support under DE-FC26-07NT43123, awarded by the United States Department of Energy. The Government has certain rights in this invention.

TECHNICAL FIELD

Embodiments of the subject matter described herein relate generally to electrical systems in automotive vehicles, and more particularly, embodiments of the subject matter relate to bi-directional charging systems with galvanic isolation.

BACKGROUND

It is desirable that charging systems for electric and/or hybrid vehicles accommodate delivery of high power over wide range of operating input/output voltages, while at the same time achieving galvanic isolation, unity power factor, low harmonic distortion, high power density and low cost. Many charging systems employ a two power stage design. The first power stage includes a wide input voltage range unity power factor boost converter that provides an output voltage higher than the voltage of the energy source being charged. The second stage provides galvanic isolation and processes the voltage and current to an acceptable level for the energy source being charged. However, using two power stages is inefficient (e.g., in terms of component size, power consumption, and cost) and inflexible, that is, the two power stage charging systems often accommodate a particular combination of voltages for the two energy sources. In addition, most prior art charging systems are unidirectional, that is, the two power stages provide power processing of charging current in a single direction (e.g., AC to DC), and thus, are incapable of bi-directional energy delivery.

BRIEF SUMMARY

In accordance with one embodiment, an apparatus is provided for a charging system. The charging system comprises a first bi-directional conversion module, a second bi-directional conversion module, and an isolation module coupled between the first bi-directional conversion module and the second bi-directional conversion module. The isolation module provides galvanic isolation between the first bi-directional conversion module and the second bi-directional conversion module.

In accordance with another embodiment, a method is provided for controlling a charging system that includes including a first bi-directional conversion module coupled to a DC energy source at a DC interface and a second bi-directional conversion module coupled to an AC energy source at an AC interface. The method comprises identifying an energy delivery direction for the charging system, the energy delivery direction corresponding to a direction of a DC current at the DC interface, and operating the first bi-directional conversion module and the second bi-directional conversion module based on the energy delivery direction such that the DC current flows in the direction corresponding to the energy delivery direction.

In another embodiment, a vehicle charging system is provided. The vehicle charging system comprises a DC interface, an AC interface, a first bi-directional conversion module coupled to the DC interface, and a second bi-directional conversion module coupled to the AC interface. An isolation module is coupled between the first bi-directional conversion module and the second bi-directional conversion module, and the isolation module provides galvanic isolation between the first bi-directional conversion module and the second bi-directional conversion module. A control module is coupled to the AC interface, the DC interface, the first bi-directional conversion module, and the second bi-directional conversion module. The control module is configured to identify an energy delivery direction and operate the first bi-directional conversion module and the second bi-directional conversion module based on the energy delivery direction such that a DC current at the DC interface is in the direction corresponding to the energy delivery direction.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
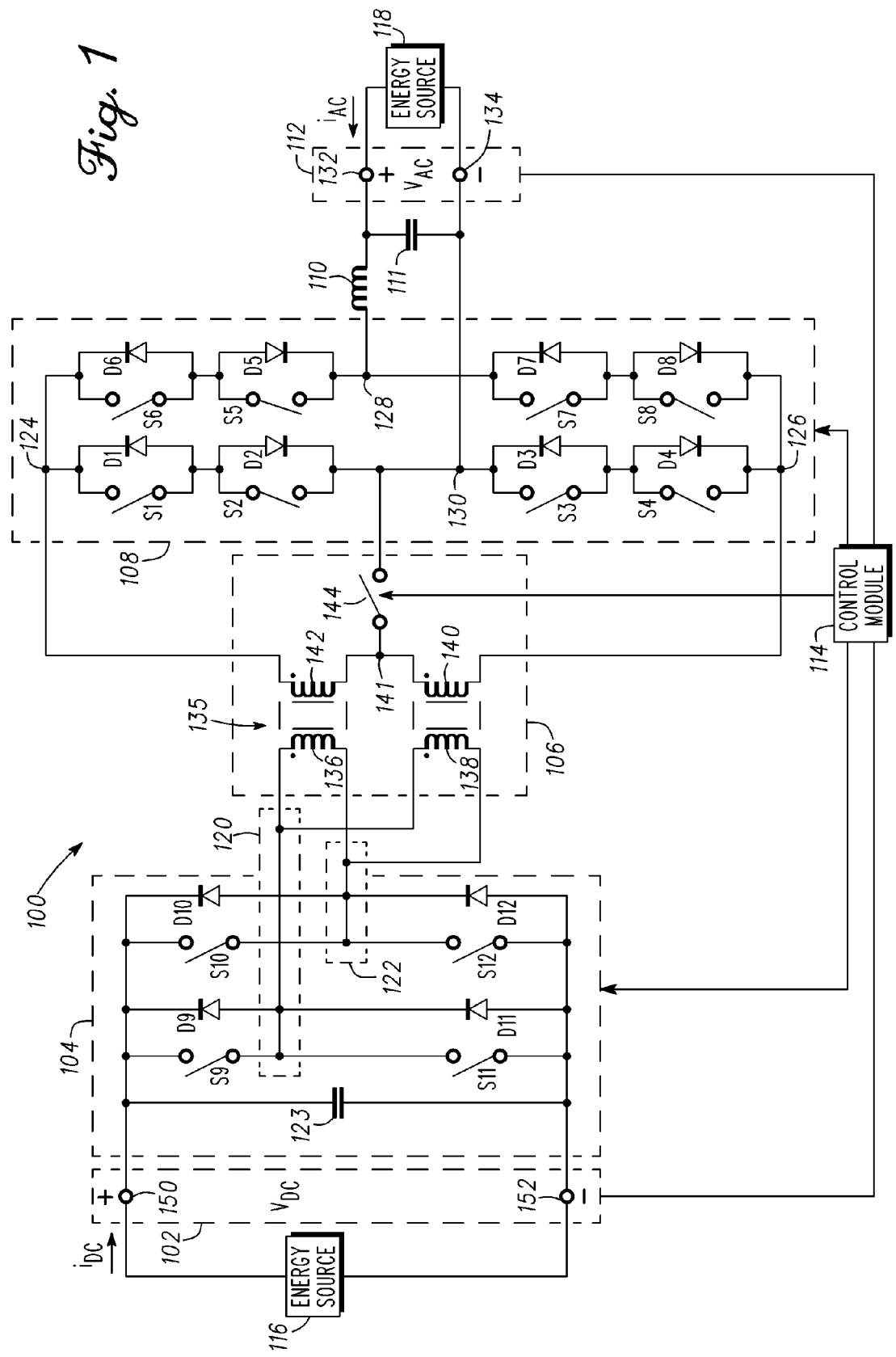
FIG. 1 is a schematic view of a charging system suitable for use in a vehicle in accordance with one embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the figures may depict one exemplary arrangement of elements, additional intervening elements, devices, features, or components may be present in an embodiment of the depicted subject matter. In addition, certain terminology may also be used in the following description for the purpose of reference only, and thus is not intended to be limiting. The terms "first", "second" and other such numerical terms referring to structures do not imply a sequence or order unless clearly indicated by the context.

For the sake of brevity, conventional techniques related to electrical energy and/or power conversion, electrical charging systems, power converters, transformer construction and/or design, pulse-width modulation (PWM), and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Technologies and concepts discussed herein relate generally to a charging system capable of bi-directional energy (or power) delivery while simultaneously accommodating wide voltage ranges, unity power factor, galvanic isolation, low harmonic distortion, and high power density. The charging system may be used to charge a DC energy source, for example, a rechargeable battery in a electric and/or hybrid vehicle, from an AC energy source, such as, for example, the mains electrical supply, or alternatively, to deliver energy from the DC energy source to the AC energy source, also referred to as vehicle to grid.

FIG. 1 depicts an exemplary embodiment of a charging system 100 (or alternatively, a charger or charging module) suitable for use in a vehicle, such as, for example, an electric and/or hybrid vehicle. The charging system 100 includes, without limitation, a first interface 102, a first bi-directional conversion module 104, an isolation module 106, a second bi-directional conversion module 108, an inductor 110, a capacitor 111, a second interface 112, and a control module 114. In an exemplary embodiment, the control module 114 is coupled to the bi-directional conversion modules 104, 108 and operates the bi-directional conversion modules 104, 108 in a manner that achieves a desired power flow to/from an energy source 116 coupled to the first interface 102 from/to an energy source 118 coupled to the second interface 112, as described in greater detail below.

It should be understood that FIG. 1 is a simplified representation of a charging system 100 for purposes of explanation and is not intended to limit the scope or applicability of the subject matter described herein in any way. Thus, although FIG. 1 depicts direct electrical connections between circuit elements and/or terminals, alternative embodiments may employ intervening circuit elements and/or components while functioning in a substantially similar manner.

In an exemplary embodiment, the first interface 102 is coupled to the first bi-directional conversion module 104 which, in turn, is coupled to the isolation module 106. The isolation module 106 is coupled to the second bi-directional conversion module 108 which, in turn, is coupled to the inductor 110 which is coupled to the AC interface 112. In an exemplary embodiment, the control module 114 is coupled to the interfaces 102, 112 and the bi-directional conversion modules 104, 108. The first interface 102 generally represents the physical interface (e.g., terminals, connectors, and the like) for coupling the charging system 100 to a DC energy source 116. The DC energy source 116 (or alternatively, the energy storage source or ESS) is capable of providing and/or receiving a direct current ($i_{DC}$) to/from the charging system 100 at a particular DC voltage level ($V_{DC}$). In accordance with one embodiment, the DC energy source 116 is a rechargeable high-voltage battery pack capable of storing regenerative energy. In other embodiments, the DC energy source 116 may comprise a battery, a fuel cell, an ultracapacitor, or another suitable energy storage device. In this regard, the DC energy source 116 may comprise the primary energy source for an electrical system and/or an electric motor in a vehicle. For example, the DC energy source 116 may be coupled to a power inverter coupled to the electric motor and configured to drive the electric motor via the power inverter. In an exemplary embodiment, the DC energy source 116 has a nominal DC voltage range from about 200 to 500 Volts DC.

In a similar manner, the second interface 112 generally represents the physical interface (e.g., terminals, connectors, and the like) for coupling the charging system 100 to an AC energy source 118. The AC energy source 118 (or power source) is capable of providing and/or receiving an AC current ($i_{AC}$) to/from the charging system 100 at a particular AC voltage level ($V_{AC}$). As described in greater detail below, in an exemplary embodiment, the AC interface 112 comprises AC input power connectors (or AC input power terminals) which are used when obtaining energy and/or receiving an AC current from the AC energy source 118 and AC output power connectors (or AC output power terminals) which are used when delivering energy and/or providing an AC current to the AC energy source 118.

In an exemplary embodiment, the AC energy source 118 is realized as a main power supply or main electrical system for a building, residence, or another structure within an electric power grid (e.g., mains electricity or grid power). In accordance with one embodiment, the AC energy source 118 comprises a single-phase power supply, as is common to most residential structures, which varies depending on the geographic region. For example, in the United States, the AC energy source 118 may be realized as 120 Volts (RMS) or 240 Volts (RMS) at 60 Hz, while in other regions the AC energy source 118 may be realized as 110 Volts (RMS) or 220 Volts (RMS) at 50 Hz. In alternative embodiments, the AC energy source 118 may be realized as any AC energy source suitable for operation with the charging system 100.

In an exemplary embodiment, depending on the mode of operation, first bi-directional conversion module 104 either converts DC energy from the DC energy source 116 to high-frequency energy provided to the isolation module 106 at nodes 120, 122 or converts high-frequency energy from the isolation module 106 at nodes 120, 122 to DC energy provided to the DC energy source 116, as described in greater detail below. In this regard, depending on the mode of operation, the first bi-directional conversion module 104 may operate as either an inverter (e.g., when converting DC energy from the energy source 116 to high frequency AC energy) or a rectifier (e.g., when converting high frequency AC energy to DC energy). In the illustrated embodiment, the bi-directional conversion module 104 comprises four switches (S9-S12) with each switch having a diode (D9-D12) configured antiparallel to the respective switch. As shown, the bi-directional conversion module 104 also includes a capacitor 123 configured electrically in parallel across the DC interface 102 to reduce voltage ripple at the DC interface 102, as will be appreciated in the art.

In an exemplary embodiment, the switches (S9-S12) are transistors, and may be realized using any suitable semiconductor transistor switch, such as a bipolar junction transistor (e.g., an IGBT), a field-effect transistor (e.g., a MOSFET), or any other comparable device known in the art. The switches and diodes are antiparallel, meaning the switch and diode are electrically in parallel with reversed or inverse polarity. The antiparallel configuration allows for bidirectional current flow while blocking voltage unidirectionally, as will be appreciated in the art. In this configuration, the direction of current through the switches is opposite to the direction of allowable current through the respective diodes. The antiparallel diodes are connected across each switch to provide a path for current to the DC energy source 116 for charging the DC energy source 116 when the respective switch is off while the switches are modulated (e.g., opened and/or closed) to provide a path for current from the DC energy source 116 to the isolation module 106 for delivering (or uploading) energy to the AC energy source 118.

In this regard, switch S9 is coupled between node 150 of the DC interface 102 and node 120 and configured to provide a path for current flow from node 150 to node 120 when switch S9 is closed while diode D9 is coupled between node 120 and node 150 and configured to provide a path for current flow from node 120 to node 150 (e.g., diode D9 is antiparallel to switch S9). Switch S11 is coupled between node 152 of the DC interface 102 and node 120 and configured to provide a path for current flow from node 120 to node 152 when switch S11 is closed while diode D11 is coupled between node 120 and node 152 and configured to provide a path for current flow from node 152 to node 120. In a similar manner, switch S10 is coupled between the DC interface 102 and node 122 and configured to provide a path for current flow from node 150 to node 122 when switch S10 is closed, diode D10 is coupled between node 122 and the DC interface 102 and configured to provide a path for current flow from node 122 to node 150, switch S12 is coupled between the DC interface 102 and node 122 and configured to provide a path for current flow from node 122 to node 152 when switch S12 is closed, and diode D12 is coupled between node 122 and the DC interface 102 and configured to provide a path for current flow from the node 152 to node 122.

In an exemplary embodiment, depending on the mode of operation, second bi-directional conversion module 108 (or alternatively, matrix conversion module) facilitates the flow of current (or energy) to/from the AC energy source 118 from/to to the isolation module 106, as described in greater detail below. In the illustrated embodiment, the second bi-directional conversion module 108 is realized as a front end unity power factor single-phase matrix converter comprising eight switches (S1-S8) with each switch having a diode (D1-D8) configured antiparallel to the respective switch, in a similar manner as set forth above in regards to the first bi-directional conversion module 104.

As shown in FIG. 1, a first set of switches (S1, S2) and diodes (D1, D2) are coupled between node 130 and node 124 of the second bi-directional conversion module 108 (or alternatively, matrix conversion module), with the first pair of switch and antiparallel diode (e.g., S1 and D1) being configured with opposite polarity as the second pair of switch and antiparallel diode (e.g., S2 and D2). Switch S1 and diode D2 are configured to provide a path for current flow from node 124 through switch S1 and diode D2 to node 130 when switch S1 is closed (or ON) and the voltage from node 124 to node 130 is positive (or the voltage from node 130 to node 124 is negative), and switch S2 and diode D1 are configured to provide a path for current flow from node 130 through switch S2 and diode D1 to node 124 when switch S2 is closed (or ON) and the voltage from node 124 to node 130 is negative (or the voltage from node 130 to node 124 is positive). In a similar manner, a second set of switches (S3, S4) and diodes (D3, D4) are coupled between node 130 and node 126, a third set of switches (S5, S6) and diodes (D5, D6) are coupled between node 128 and node 124, a fourth set of switches (S7, S8) and diodes (D7, D8) are coupled between node 128 and node 126. In an exemplary embodiment, the switches (S1-S8) of the second bi-directional conversion module 108 are modulated in a manner such that the AC current ($i_{AC}$) flows in a desired direction while at the same time achieving unity power factor (within realistic and/or practical operating tolerances), that is, the AC current ($i_{AC}$) from the AC energy source 118 is substantially in phase (within realistic and/or practical operating tolerances) with the AC voltage ($V_{AC}$).

In an exemplary embodiment, the inductor 110 is configured electrically in series between a first node 132 of the AC interface 112 and node 128 of the matrix conversion module 108 while a second node 134 of the AC interface 112 is coupled to node 130 of the matrix conversion module 108. The inductor 110 functions as a high-frequency inductive energy storage element during operation of the charging system 100, as described in greater detail below. The capacitor 111 is coupled between node 132 and node 134 and the capacitor 111 and inductor 110 are configured to provide a high frequency filter when the charging system 100 is providing energy from the DC energy source 116 to the AC energy source 118, as described in greater detail below.

In an exemplary embodiment, the isolation module 106 provides galvanic isolation between the two bi-directional conversion modules 104, 108. In the illustrated embodiment, the isolation module 106 is realized as a transformer 135 configurable for a plurality of different turns ratios. In an exemplary embodiment, the transformer 135 is realized as a high-frequency transformer, that is, a transformer designed for a particular power level at a high-frequency, such as the switching frequency of the switches of the conversion modules 104, 108 (e.g., 50 kHz), such that the physical size of the transformer is reduced relative to a transformer designed for the same power level at a lower frequency (e.g., the mains frequency). As used herein, the turns ratio of the isolation module 106 and/or transformer 135 should be understood as referring to the ratio of the effective number of winding turns in the secondary winding stage (e.g., windings 136, 138) of the transformer 135 the effective number of winding turns in the primary winding stage (e.g., windings 140, 142) of the transformer 135, or alternatively, the voltage across nodes 120, 122 to the voltage across nodes 124, 126, 141. It will be appreciated in the art that in response to a high frequency voltage at nodes 124, 126, 141 the isolation module 106 generates a high frequency voltage at nodes 120, 122 with a magnitude based on the turns ratio of the transformer 135, such that a larger turns ratio produces a voltage with a greater magnitude at nodes 120, 122 while a smaller turns ratio produces a voltage with a lesser magnitude at nodes 120, 122.

In an exemplary embodiment, the charging system 100 and/or isolation module 106 is configured for a plurality of operating modes, with each operating mode corresponding to a different turns ratio of the plurality of different turns ratios for the transformer 135. It should be noted that although the isolation module 106 and/or transformer 135 may be described herein in the context of a charging system 100 and/or isolation module 106 configured for two operating modes (or two different turns ratios), it will be appreciated that the charging system 100 and/or isolation module 106 may be adapted for any number of operating modes and/or turns ratios. In this regard, the operating modes and/or turns ratios will depend on the particular application and the expected combinations and/or ranges of voltage levels at the respective interfaces 102, 112 of the charging system 100. In other words, the turns ratios of the isolation module 106 and/or transformer 135 may be configured for numerous possible combinations of energy sources 116, 118 and/or voltage levels.

In an exemplary embodiment, the isolation module 106 comprises a first set of windings 136 connected between nodes 120, 122 of the first bi-directional conversion module 104, a second set of windings 138 connected between nodes 120, 122, a third set of windings 140 connected between node 126 and node 141, and a fourth set of windings 142 connected between node 124 and node 141. For purposes of explanation, the sets of windings 140, 142 may be referred to herein as comprising the primary winding stage (or primary windings) of the transformer 135 and the sets of windings 136, 138 may be referred to herein as comprising the secondary winding stage (or secondary windings). The primary windings 140, 142 are magnetically coupled to the secondary windings 136, 138 in a conventional manner, as will be appreciated in the art.

In an exemplary embodiment, a switching element 144 is connected between node 141 of the primary winding stage of the isolation module 106 and node 130 of the matrix conversion module 108. In this regard, the third set of windings 140 and the fourth set of windings 142 are configured electrically in series when the switching element 144 is open (or OFF), while the first set of windings 136 and the second set of windings 138 are configured electrically in parallel. Thus, when the switching element 144 is closed (or ON), the effective number of winding turns of the primary windings stage of the transformer 135 (e.g., the effective number of turns of primary windings 140, 142) is reduced, such that closing (or turning ON) the switching element 144 increases the turns ratio of the isolation module 106 and/or transformer 135. Conversely, when the switching element 144 is opened (or turned OFF), the two sets of primary windings 140, 142 are in series and the two sets of secondary windings 136, 138 are in parallel, such that opening the switching element 144 decreases the turns ratio of the isolation module 106 and/or transformer 135. The switching element 144 may be realized using a suitable semiconductor transistor switch, such as a bipolar junction transistor (e.g., an IGBT), a field-effect transistor (e.g., a MOSFET), or any other comparable device known in the art. As set forth above, it should be appreciated that the isolation module 106 and/or transformer 135 may be adapted to include additional sets of windings and additional switching elements to accommodate any number of turns ratios and/or operating modes. In this regard, it should be noted that number of winding turns in the sets of windings 136, 138, 140, 142 may be modified depending on the needs of a particular application, and the subject matter is not intended to be limited to any particular configuration or number of winding turns.

The control module 114 generally represents the hardware, firmware and/or software configured to modulate the switches of the bi-directional conversion modules 104, 108 to achieve a desired power flow between the DC energy source 116 and the AC energy source 118, as described in greater detail below. The control module 114 may be implemented or realized with a general purpose processor, a microprocessor, a microcontroller, a content addressable memory, a digital signal processor, an application specific integrated circuit, a field programmable gate array, any suitable programmable logic device, discrete gate or transistor logic, discrete hardware components, or any combination thereof, designed to support and/or perform the functions described herein.

As described in greater detail below, in an exemplary embodiment, the control module 114 identifies an energy delivery direction for the charging system 100 that corresponds to the direction of the DC current ($i_{DC}$) at the DC interface 102. In this regard, if the energy delivery direction corresponds to a DC current flowing from the DC energy source 116 and to the AC energy source 118 (e.g., $i_{DC}$>0), that is, delivering energy to the AC energy source 118 from the DC energy source 116 (or alternatively, a DC-to-AC energy delivery direction), the control module 114 operates the first bi-directional conversion module 104 as a power inverter by modulating switches (S9-S12) to convert the DC voltage ($V_{DC}$) to a high frequency voltage at nodes 120, 122 and operates the second bi-directional conversion module 108 as a cycloconverter by modulating switches (S1-S8) to convert the high frequency voltage at nodes 124, 126, 141 to the low frequency AC voltage ($V_{AC}$) at the AC interface 112 such that the AC current ($i_{AC}$) flows to the AC energy source 118. If the energy delivery direction corresponds to a DC current flowing from the first bi-directional conversion module 104 to the DC energy source 116 (e.g., $i_{DC}$<0), that is, delivering energy to (or charging) the DC energy source 116 from the AC energy source 118 (or alternatively, a AC-to-DC energy delivery direction), the control module 114 modulates switches (S1-S8) to convert the AC voltage ($V_{AC}$) to a high frequency voltage such that the AC current ($i_{AC}$) flows from the AC energy source 118 and in phase with the AC voltage ($V_{AC}$). In an exemplary embodiment, the isolation module 106 generates a high frequency voltage at nodes 120, 122 which is rectified by diodes (D9-D12) of the first bi-directional conversion module 104 to provide current to the DC energy source 116 at the DC voltage level ($V_{DC}$) which charges the DC energy source 116. The control module 114 is also coupled to the interfaces 102, 112 and the switching element 144, and the control module 114 activates (e.g., opens or closes) the switching element 144 based on the voltage levels at the interfaces 102, 112, as described in greater detail below.

Figure 2:
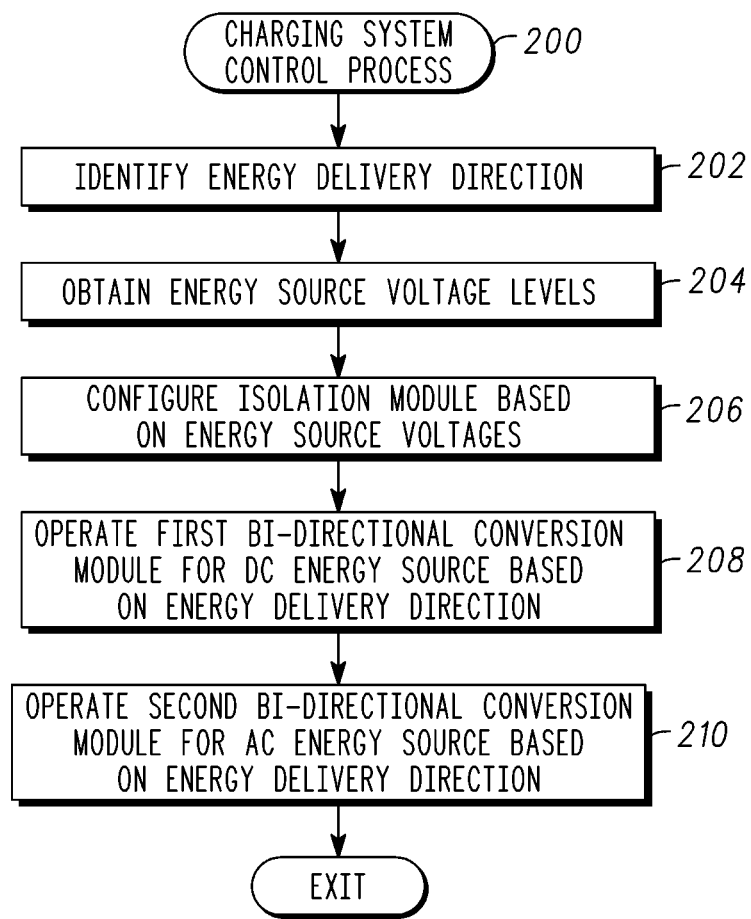
FIG. 2 is a flow diagram of charging system control process suitable for use with the charging system of FIG. 1 in accordance with one embodiment.

Referring now to FIG. 2, in an exemplary embodiment, a charging system may be configured to perform a charging system control process 200 and additional tasks, functions, and operations described below. The various tasks may be performed by software, hardware, firmware, or any combination thereof. For illustrative purposes, the following description may refer to elements mentioned above in connection with FIG. 1. In practice, the tasks, functions, and operations may be performed by different elements of the described system, such as the first bi-directional conversion module 104, the isolation module 106, the matrix conversion module 108, and/or the control module 114. It should be appreciated that any number of additional or alternative tasks may be included, and may be incorporated into a more comprehensive procedure or process having additional functionality not described in detail herein.

Referring to FIG. 2, and with continued reference to FIG. 1, a charging system control process 200 may be performed to allow a charging system 100 to accommodate bi-directional energy delivery, that is, providing energy to an AC energy source from a DC energy source or charging a DC energy source from an AC energy source. In an exemplary embodiment, the charging system control process 200 begins by identifying an energy delivery direction for the charging system (task 202). In this regard, as set forth above, the energy delivery direction corresponds to the direction of the DC current ($i_{DC}$) to/from the DC energy source 116 from/to the charging system 100. A DC-to-AC energy delivery direction corresponds to a DC current flowing from the DC energy source 116 (e.g., $i_{DC}$>0) and an AC current flowing to the AC energy source 118, that is, delivering energy to the AC energy source 118 from the DC energy source 116. An AC-to-DC energy delivery direction corresponds to an AC current from the AC energy source 118 to the charging system 100 that results in DC current flowing to the DC energy source 116 (e.g., $i_{DC}$<0), that is, charging the DC energy source 116 from the AC energy source 118.

In an exemplary embodiment, the charging system control process 200 and/or control module 114 identifies the energy delivery direction based on the configuration and/or coupling of the AC energy source 118 to the AC interface 112. For example, if the AC interface 112 comprises AC input power connectors (or AC input power terminals) and AC output power connectors (or AC output power terminals), the control module 114 may identify the energy delivery direction of AC-to-DC when the control module 114 detects that the AC energy source 118 coupled to the AC interface 112 via the AC input power connectors. Alternatively, if the control module 114 detects that the AC energy source 118 is coupled to the AC interface 112 via the AC output power connectors, the control module 114 determines the DC-to-AC energy delivery direction. In alternative embodiments, the charging system control process 200 and/or control module 114 may identify the energy delivery direction in response to a user input or a command from another component of the vehicle electrical system (e.g., a command from an electronic control unit (ECU)).

In an exemplary embodiment, the charging system control process 200 continues by obtaining the voltage levels of the energy sources coupled to the charging system (task 204). For example, the control module 114 may obtain the voltage level of the DC energy source by obtaining the DC voltage ($V_{DC}$) at the DC interface 102 of the charging system 100 (e.g., via a suitably configured sensing arrangement). In alternative embodiments, the desired voltage level at the DC interface 102 may be predetermined and stored in the control module 114, or the desired voltage level at the DC interface 102 selected by a user and provided to the control module 114 and/or charging system 100. The control module 114 may obtain the voltage level of the AC energy source by obtaining the AC voltage ($V_{AC}$) at the AC interface 112 of the charging system 100.

In an exemplary embodiment, the charging system control process 200 continues by configuring the isolation module based on the obtained voltage levels (task 206). In this regard, the charging system control process 200 and/or control module 114 determines the appropriate turns ratio for the isolation module 106 based on the ratio of the DC voltage ($V_{DC}$) at the DC interface 102 to the AC voltage ($V_{AC}$) at the AC interface 112 and adjusts the isolation module 106 (e.g., by opening or closing the switching element 144) to achieve the desired turns ratio. When the ratio of the DC voltage ($V_{DC}$) at the DC interface 102 to the AC voltage ($V_{AC}$) at the AC interface 112 is such that the turns ratio of the isolation module 106 should be decreased (e.g., in order to step-down the AC voltage ($V_{AC}$) to accommodate the DC voltage ($V_{DC}$) or alternatively, to step-up the DC voltage ($V_{DC}$) to accommodate the AC voltage ($V_{AC}$)), the control module 114 decreases the turns ratio of the isolation module 106, for example, by opening (or turning OFF) the switching element 144. In an exemplary embodiment, the control module 114 decreases the turns ratio of the isolation module 106 when the peak value of the AC voltage at the AC interface 112 is greater than the DC voltage level at the DC interface 102, in other words, when $\sqrt{2} \times V_{AC} > V_{DC}$ where $V_{AC}$ is the RMS voltage at the AC interface 112. In a similar manner, when the ratio of the DC voltage ($V_{DC}$) at the DC interface 102 to the AC voltage ($V_{AC}$) at the AC interface 112 is such that the turns ratio of the isolation module 106 should be increased (e.g., in order to step-up the AC voltage ($V_{AC}$) to accommodate the DC voltage ($V_{DC}$) or alternatively, to step-down the DC voltage ($V_{DC}$) to accommodate the AC voltage ($V_{AC}$)), the control module 114 increases the turns ratio of the isolation module 106, for example, by closing (or turning ON) the switching element 144. In an exemplary embodiment, the control module 114 increases the turns ratio of the isolation module 106 when the peak value of the AC voltage at the AC interface 112 is less than or equal to the DC voltage level at the DC interface 102, in other words, when $\sqrt{2} \times V_{AC} < V_{DC}$ where $V_{AC}$ is the RMS voltage at the AC interface 112. In accordance with one embodiment, the control module 114 is configured to close the switching element 144 when the peak voltage of the AC voltage ($V_{AC}$) is less than the DC voltage ($V_{DC}$) and open the switching element 144 when the peak voltage of the AC voltage ($V_{AC}$) is greater than the DC voltage ($V_{DC}$)

In an exemplary embodiment, the charging system control process 200 continues by operating the first bi-directional conversion module based on the identified energy delivery direction (task 208). In this regard, if the identified energy delivery direction corresponds to DC-to-AC (e.g., delivering energy to the AC energy source 118 from the DC energy source 116), the control module 114 operates the first bi-directional conversion module 104 as a power inverter by modulating the switches (S9-S12) to produce a high-frequency voltage at nodes 120, 122. For example, in accordance with one embodiment, the control module 114 utilizes PWM techniques to modulate the switches (S9-S12) to produce a voltage at the nodes 120, 122 having a fifty percent duty cycle at the switching frequency (e.g., 50 kHz) of the charging system 100. If the identified energy delivery direction corresponds to AC-to-DC (e.g., charging the DC energy source 116 from the AC energy source 118), in accordance with one embodiment, the control module 114 operates the first bi-directional conversion module 104 as a synchronous rectifier to rectify the voltage at nodes 120, 122 to the DC voltage level ($V_{DC}$) by closing (or turning ON) switches S9 and S12 and opening (or turning OFF) switches S10 and S10 when the voltage at node 122 is greater than the voltage at node 120 and opening (or turning OFF) switches S9 and S12 and closing (or turning ON) switches S10 and S11 when the voltage at node 122 is less than the voltage at node 120. In an alternative embodiment, the first bi-directional conversion module 104 may be operated as a full-wave bridge rectifier (e.g., by maintaining switches (S9-S12) open or turned OFF).

The charging system control process 200 continues by operating the second bi-directional conversion module based on the identified energy delivery direction and the obtained energy source voltages (task 210). In this regard, the control module 114 modulates the switches (S1-S8) of the matrix conversion module 108 to achieve unity power factor and low harmonic distortion at the AC interface 112 while simultaneously achieving the desired current flow. If the identified energy delivery direction corresponds to DC-to-AC, the control module 114 modulates the switches (S1-S8) at the switching frequency to convert the high frequency voltage from the isolation module 106 to the AC voltage level ($V_{AC}$) and frequency at the AC interface 112 while simultaneously achieving an AC current flowing to the AC energy source 118. In accordance with one embodiment, the control module 114 operates the matrix conversion module 108 such that the AC voltage at the AC interface 112 is substantially in sync with the AC energy source 118, that is, the AC voltage at the AC interface 112 has the same frequency (within practical and/or realistic operating tolerances) as the AC energy source 118. Depending on the embodiment, the control module 114 operates the matrix conversion module 108 to provide a wider range of active and/or reactive energy flow to the AC energy source 118 for purposes of power factor correction, voltage regulation, or reduce the loading of the AC energy source 118. If the identified energy delivery direction corresponds to AC-to-DC, the control module 114 modulates the switches (S1-S8) of the matrix conversion module 108 at the switching frequency to convert the AC voltage at the AC interface 112 to a high frequency voltage at the isolation module 106, which, in turn, generates a high-frequency voltage at nodes 120, 122 that results in the desired DC voltage level ($V_{DC}$) at the DC interface 102. Additionally, the control module 114 operates the matrix conversion module 108 to achieve unity power factor at the AC interface 112, that is, the AC current ($i_{AC}$) flowing from the AC energy source 118 is substantially in phase with the AC voltage ($V_{AC}$) at the AC interface 112.

In an exemplary embodiment, the control module 114 utilizes high-frequency PWM techniques to modulate the switches (S1-S8) of the matrix conversion module 108 with variable duty cycles at the switching frequency. In an exemplary embodiment, the control module 114 implements the appropriate switching pattern and/or state machine corresponding to the identified energy delivery direction and cycles the switches (S1-S8) sequentially through states of the state machine during a switching interval which is equal to the inverse of the switching frequency ($f_s$). In accordance with one embodiment, the control module 114 generates a sinusoidal pulse width modulated (PWM) variable duty cycle control signal that controls the state machine transitions, and thereby, the duty cycle of the switches (S1-S8). For example, in an exemplary embodiment, the control module 114 modulates the duty cycle of the switches (S1-S8) of the matrix conversion module 108 to alternate between cycling energy through the matrix conversion module 108 and delivering energy to/from the AC energy source 118 as needed throughout operation of the charging system 100.

To briefly summarize, advantages of the system and/or method described above is that a charging system can accommodate bi-directional power delivery (e.g., charging a DC energy source from an AC energy source or delivering power to the AC energy source from the DC energy source). In this regard, the second bi-directional conversion module 108 and the isolation module 106 are cooperatively configured as a single power stage that accommodates a wide voltage range and unity power factor at the AC interface while simultaneously achieving galvanic isolation and high power density.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A charging system comprising:
   a first bi-directional conversion module;
   a second bi-directional conversion module;
   a DC interface coupled to the first bi-directional conversion module;
   an AC interface coupled to the second bi-directional conversion module;
   an isolation module coupled between the first bi-directional conversion module and the second bi-directional conversion module, the isolation module providing galvanic isolation between the first bi-directional conversion module and the second bi-directional conversion module; and
   a control module coupled to the first bi-directional conversion module and the second bi-directional conversion module, the control module being configured to:
   identify an energy delivery direction for the charging system; and
   when the energy delivery direction corresponds to a DC current flowing from a DC energy source coupled to the DC interface:
   operate the first bi-directional conversion module based on the energy delivery direction to convert DC energy from the DC energy source to a first high frequency voltage at the isolation module such that the DC current at the DC interface is in the energy delivery direction; and
   operate the second bi-directional conversion module based on the energy delivery direction to convert a second high frequency voltage generated by the isolation module in response to the first high frequency voltage to a lower frequency AC voltage at the AC interface such that an AC current at the AC interface flows to an AC energy source coupled to the AC interface.

2. The charging system of claim 1, the DC energy source having a DC voltage and the AC energy source having the lower frequency AC voltage, wherein the control module is configured to adjust a turns ratio of the isolation module based on a ratio of the DC voltage to the AC voltage, wherein the isolation module generates the second high frequency voltage having a magnitude based on the turns ratio.

3. The charging system of claim 1, the AC interface including an AC input power connector and an AC output power connector, wherein the control module is configured to:
   identify the energy delivery direction as DC-to-AC when the AC energy source is coupled to the AC output power connector; and
   identify the energy delivery direction as AC-to-DC when the AC energy source is coupled to the AC input power connector.

4. The charging system of claim 1, wherein the first bi-directional conversion module comprises:
   a first node;
   a second node;

a third node coupled to the isolation module;
a fourth node coupled to the isolation module;
a first switch coupled between the first node and the third node and configured to provide a path for current flow from the first node to the third node;
a first diode coupled between the first node and the third node and configured to provide a path for current flow from the third node to the first node;
a second switch coupled between the second node and the third node and configured to provide a path for current flow from the third node to the second node;
a second diode coupled between the second node and the third node and configured to provide a path for current flow from the second node to the third node;
a third switch coupled between the first node and the fourth node and configured to provide a path for current flow from the first node to the fourth node;
a third diode coupled between the first node and the fourth node and configured to provide a path for current flow from the fourth node to the first node;
a fourth switch coupled between the second node and the fourth node and configured to provide a path for current flow from the fourth node to the second node; and
a fourth diode coupled between the second node and the fourth node and configured to provide a path for current flow from the second node to the fourth node.

5. The charging system of claim 4, wherein the second bi-directional conversion module comprises:
a fifth node;
a sixth node;
a seventh node coupled to the isolation module;
an eighth node coupled to the isolation module;
a first set of switches coupled between the fifth node and the seventh node, each switch of the first set of switches having a diode configured antiparallel to the respective switch;
a second set of switches coupled between the sixth node and the seventh node, each switch of the second set of switches having a diode configured antiparallel to the respective switch;
a third set of switches coupled between the fifth node and the eighth node, each switch of the third set of switches having a diode configured antiparallel to the respective switch; and
a fourth set of switches coupled between the sixth node and the eighth node, each switch of the fourth set of switches having a diode configured antiparallel to the respective switch.

6. The charging system of claim 1, further comprising an inductor coupled electrically in series between the AC interface and the second bi-directional conversion module.

7. A method for controlling a charging system including a first bi-directional conversion module coupled to a DC energy source at a DC interface and a second bi-directional conversion module coupled to an AC energy source at an AC interface, the AC energy source having an AC voltage, the method comprising:
identifying an energy delivery direction for the charging system, the energy delivery direction corresponding to a DC current at the DC interface flowing from the DC energy source;
operating the first bi-directional conversion module to convert DC energy from the DC energy source to a first high frequency voltage such that the DC current flows in the direction corresponding to the energy delivery direction; and
operating the second bi-directional conversion module based on the energy delivery direction to convert a second high frequency voltage generated in response to the first high frequency voltage to the AC voltage at the AC interface such that an AC current at the AC interface flows to the AC energy source.

8. The method of claim 7, wherein the operating the first bi-directional conversion module and the second bi-directional conversion module comprises modulating switches of the first bi-directional conversion module such that the DC current flows in the energy delivery direction.

9. The method of claim 7, the DC energy source having a DC voltage, wherein if the energy delivery direction corresponds to AC-to-DC, the method further comprises:
operating the second bi-directional conversion module to convert the AC voltage to a third high frequency voltage, wherein the AC current flows from the AC energy source to the charging system;
generating a fourth high frequency voltage in response to the third high frequency voltage; and
operating the first bi-directional conversion module to convert the fourth high frequency voltage to the DC voltage at the DC interface.

10. The method of claim 7, the charging system including an isolation module coupled between the first bi-directional conversion module and the second bi-directional conversion module, wherein the method further comprises adjusting a turns ratio of the isolation module based on a ratio of a DC voltage of the DC energy source to the AC voltage.

11. A vehicle charging system comprising:
a DC interface coupled to a DC energy source having a DC voltage;
an AC interface coupled to an AC energy source having an AC voltage;
a first bi-directional conversion module coupled to the DC interface;
a second bi-directional conversion module coupled to the AC interface;
an isolation module coupled between the first bi-directional conversion module and the second bi-directional conversion module, the isolation module providing galvanic isolation between the first bi-directional conversion module and the second bi-directional conversion module; and
a control module coupled to the AC interface, the DC interface, the first bi-directional conversion module, and the second bi-directional conversion module, wherein the control module is configured to:
identify an energy delivery direction; and
when the energy delivery direction corresponds to a DC current flowing from the DC energy source:
operate the first bi-directional conversion module to convert the DC voltage to a first high frequency voltage at the isolation module based on the energy delivery direction such that the DC current at the DC interface is in the energy delivery direction, wherein the isolation module generates a second high frequency voltage in response to the first high frequency voltage; and
operate the second bi-directional conversion module based on the energy delivery direction to convert the second high frequency voltage from the isolation module to the AC voltage at the AC interface such that the AC current at the AC interface flows to the AC energy source.

12. The vehicle charging system of claim 11, the first bi-directional conversion module including a first plurality of switches coupled between the DC interface and the isolation module and the second bi-directional conversion module including a second plurality of switches coupled between the AC interface and the isolation module, wherein the control module is configured to:
  modulate the first plurality of switches to convert the DC voltage to the first high frequency voltage; and
  modulate the second plurality of switches to convert the second high frequency voltage to the AC voltage.

13. The vehicle charging system of claim 11, wherein the control module is coupled to the isolation module and configured to adjust a turns ratio of the isolation module based on a ratio of the DC voltage to the AC voltage, wherein the isolation module generates the second high frequency voltage in response to the first high frequency voltage with a magnitude based on the turns ratio.

* * * * *